US008005858B1

(12) United States Patent
Lynch et al.

(10) Patent No.: US 8,005,858 B1
(45) Date of Patent: Aug. 23, 2011

(54) METHOD AND APPARATUS TO LINK TO A RELATED DOCUMENT

(75) Inventors: Michael R. Lynch, Royston (GB); Timothy J. Gover, Chesterton (GB); Robin J. Hughes, Cambridge (GB)

(73) Assignee: Autonomy Corporation PLC, Cambridge (GB)

( * ) Notice: Subject to any disclaimer, the term of this patent is extended or adjusted under 35 U.S.C. 154(b) by 645 days.

(21) Appl. No.: 11/855,127

(22) Filed: Sep. 13, 2007

Related U.S. Application Data

(63) Continuation of application No. 09/872,938, filed on May 31, 2001, now Pat. No. 7,272,594.

(51) Int. Cl.
*G06F 17/30* (2006.01)

(52) U.S. Cl. .......... 707/771; 707/723; 707/E17.082; 707/E17.133; 715/205; 715/234

(58) Field of Classification Search .......... 707/999.003, 707/999.104, E17.082, E17.133, 723, 758, 707/771; 715/205, 234, 778
See application file for complete search history.

(56) References Cited

U.S. PATENT DOCUMENTS

| | | | |
|---|---|---|---|
| 5,418,951 A | 5/1995 | Damashek | |
| 5,649,192 A | 7/1997 | Stucky | |
| 5,675,819 A | 10/1997 | Schuetze | |
| 5,734,916 A | 3/1998 | Greenfield et al. | |
| 5,799,268 A | 8/1998 | Boguraev | |
| 5,974,412 A | 10/1999 | Hazlehurst et al. | |
| 5,983,216 A | 11/1999 | Kirsch et al. | |
| 6,006,221 A | 12/1999 | Liddy et al. | |
| 6,026,409 A | 2/2000 | Blumenthal | |
| 6,055,569 A | 4/2000 | O'Brien et al. | |
| 6,078,914 A | 6/2000 | Redfern | |
| 6,122,647 A * | 9/2000 | Horowitz et al. ............. | 715/205 |
| 6,137,911 A | 10/2000 | Zhilyaev | |
| 6,233,571 B1 | 5/2001 | Egger et al. | |
| 6,243,708 B1 | 6/2001 | deVries et al. | |
| 6,295,543 B1 | 9/2001 | Block et al. | |
| 6,327,590 B1 | 12/2001 | Chidlovskii et al. | |
| 6,336,124 B1 | 1/2002 | Alam et al. | |
| 6,356,899 B1 | 3/2002 | Chakrabarti et al. | |
| 6,397,211 B1 | 5/2002 | Cooper | |
| 6,438,539 B1 | 8/2002 | Korolev et al. | |
| 6,477,524 B1 | 11/2002 | Taskiran et al. | |
| 6,480,837 B1 | 11/2002 | Dutta | |
| 6,480,843 B2 | 11/2002 | Li | |
| 6,493,711 B1 | 12/2002 | Jeffrey | |
| 6,510,434 B1 | 1/2003 | Anderson et al. | |

(Continued)

OTHER PUBLICATIONS

Anhai Doan et al., Reconciling Schemas of Disparate Data Sources: A Machine-Learning Approach, ACM SIGMOD Record, Proceedings of the 2001 AC, SIGMOD International Conference on Management of Data SIGMOD '01, vol. 30 Issue 2, May 21-24, 2001.

(Continued)

*Primary Examiner* — Leslie Wong
(74) *Attorney, Agent, or Firm* — Rutan & Tucker, LLP

(57) ABSTRACT

A method, apparatus, and system exist to generate a ranked list of one or more related documents and a link to each of the one or more related documents. The one or more related documents are ranked based upon relevance to the first representation of content associated with a specified field of the reference extensible markup language document. The one or more related documents may also be ranked based upon relevance to content in an active desktop window.

18 Claims, 7 Drawing Sheets

U.S. PATENT DOCUMENTS

| | | | |
|---|---|---|---|
| 6,513,031 | B1 | 1/2003 | Fries et al. |
| 6,513,036 | B2 | 1/2003 | Fruensgaard et al. |
| 6,516,308 | B1 | 2/2003 | Cohen |
| 6,523,026 | B1 | 2/2003 | Gillis |
| 6,535,896 | B2 | 3/2003 | Britton et al. |
| 6,560,590 | B1 | 5/2003 | Shwe et al. |
| 6,560,600 | B1 | 5/2003 | Broder |
| 6,584,468 | B1 | 6/2003 | Gabriel et al. |
| 6,592,627 | B1 | 7/2003 | Agrawal et al. |
| 6,601,026 | B2 * | 7/2003 | Appelt et al. ............ 704/9 |
| 6,601,075 | B1 | 7/2003 | Huang et al. |
| 6,611,825 | B1 | 8/2003 | Billheimer et al. |
| 6,618,727 | B1 | 9/2003 | Wheeler et al. |
| 6,631,367 | B2 | 10/2003 | Teng et al. |
| 6,635,088 | B1 | 10/2003 | Hind et al. |
| 6,635,089 | B1 | 10/2003 | Burkett et al. |
| 6,651,219 | B1 | 11/2003 | Elliott |
| 6,654,754 | B1 | 11/2003 | Knauft et al. |
| 6,657,350 | B2 | 12/2003 | Kimura et al. |
| 6,665,661 | B1 | 12/2003 | Crow et al. |
| 6,668,256 | B1 | 12/2003 | Lynch |
| 6,675,353 | B1 | 1/2004 | Friedman |
| 6,675,354 | B1 | 1/2004 | Claussen et al. |
| 6,718,324 | B2 | 4/2004 | Edlund et al. |
| 6,732,102 | B1 | 5/2004 | Khandekar |
| 6,738,798 | B1 | 5/2004 | Ploetz et al. |
| 6,804,662 | B1 | 10/2004 | Annau et al. |
| 6,848,078 | B1 | 1/2005 | Birsan et al. |
| 6,985,898 | B1 | 1/2006 | Ripley et al. |
| 7,031,961 | B2 | 4/2006 | Pitkow et al. |
| 7,233,950 | B2 * | 6/2007 | Smith, III ............ 1/1 |
| 7,353,246 | B1 * | 4/2008 | Rosen et al. ............ 709/202 |
| 2001/0020238 | A1 | 9/2001 | Tsuda |
| 2001/0032217 | A1 | 10/2001 | Huang |
| 2001/0037332 | A1 | 11/2001 | Miller et al. |
| 2001/0037345 | A1 | 11/2001 | Kiernan et al. |
| 2002/0002483 | A1 | 1/2002 | Siegel et al. |
| 2002/0052898 | A1 | 5/2002 | Schilit et al. |
| 2002/0129014 | A1 | 9/2002 | Kim et al. |
| 2002/0156760 | A1 | 10/2002 | Lawrence et al. |
| 2002/0169764 | A1 * | 11/2002 | Kincaid et al. ............ 707/3 |
| 2003/0028512 | A1 | 2/2003 | Stensmo |
| 2003/0079185 | A1 | 4/2003 | Katariya et al. |
| 2003/0084040 | A1 | 5/2003 | Jeffrey |
| 2003/0167266 | A1 | 9/2003 | Saldanha et al. |
| 2007/0156761 | A1 * | 7/2007 | Smith, III ............ 707/104.1 |

OTHER PUBLICATIONS

Autonomy, About Autonomy, Aug. 2001, pp. 1-2 http://www.autonomy.com/autonomy_v3Widgets/Prints/Print.pxml.
Autonomy—Adding Intelligence to the XML, Nov. 2000, pp. 1-3. http://www.autonomy.com/autonomy/dynamic/autopage466.shtml.
Autonomy, Adding Intelligence to XML, Aug. 2001, pp. 1-3 http://www.autonomy.com/autonomy_v3Widgets/Prints/Print.pxml.
"Autonomy Delivers Agentware i3™ Product Line," Palo Alto, CA., Aug. 5, 1997.
"Autonomy Enables Butterworths," Feb. 8, 1999.
"Autonomy First to Fully Automate XML Tagging," Jun. 2, 1998.
Autonomy, First to Fully Automate XML Tagging, Jun. 1998, pp. 1-2. http://www.autonomy.com/autonomy/dynamic/autopaqe150.shtml.
"Autonomy Helps Vignette Customers Quickly Reap the Benefits of Internet Relationship Management," Jan. 4, 1999.
Autonomy, Intellectual Foundations, Aug. 2001, pp. 1-2 http://www.autonomy.com/autonomy_v3Widgets/Prints/Print.pxml.
Autonomy, Kenjin, Bring autonomy's technology to your PC, Mar. 2001 http://www.autonomy.com/autonomy/dynamic/autopage203.shtml.
"Autonomy Launches Portal-In-A-Box™ Eliminates Need for Costly Manual Labor in Creating and Maintaining Portal Sites," Feb. 1, 1999.
Autonomy, Limitations of Other Approaches, Aug. 2001, pp. 1-2 http://www.autonomy.com/autonomy_v3Widgets/Prints/Print.pxml.
Autonomy, Solutions Landing Page, Feb. 2001, pp. 1-2 http://www.autonomy.com.autonomy/dynamic/autopage442.shtml.
Autonomy, Technology, Aug. 2001, pp. 1-2 http://www.autonomy.com/autonomy_v3Widgets/Prints/Print.pxml.
Autonomy, Technology Benefits, Aug. 2001, p. 1 http://www.autonomy.com/autonomy_v3Widgets/Prints/Print.pxml.
"Autonomy Technology Helps Leading Network Services Company to Create Online 'Brain Trusts'," Aug. 24, 1999.
Autonomy, Technology White Paper, Sep. 1997, pp. 1-17. www.autonomy.com.
Autonomy, Technology White Paper, Aug. 2001, pp. 1-19.
"Autonomy Unveils New Platform for Applications Using Unstructured Data," Jan. 25, 2000.
Autonomy, XML White Paper, Aug. 2001, pp. 1-12.
"Caredata.com Licences Autonomy Technology for Citeline Web Research Tools," Dec. 14, 1999.
Crouch.C., et al., "Experiments in Automatic Statistical Thesaurus Construction", Jun. 1992 pp. 77-88.
Fortier, Paul, "SQL-3 Implementing the Object-Relational Database,"1999, McGraw-Hill, pp. 17-37.
Haykin, S., *Adaptive Filter Theory*, Englewood Cliffs, N.J.: Prentice-Hall, 1986, Chapters 5 and 8.
Ivankhnenko, A.. "Heuristic Self-Organization in Problems of Engineering Cybernetics Automatica," vol. 6, Mar. 1970, pp. 207-219.
Klema, V., et al., "The Singular Valve Decomposition: Its Computation and Some Applications," IEEE Trans. AC, vol. AC-25, No. 2, Apr. 1980, pp. 164-176.
M.R. Lynch, P.J. Rayner and S.B. Holden, ICASSP 91 vol. 3 D, Digital Signal Processing, Removal of Degeneracy in Adaptive Volterra Networks by Dynamic Structuring, May 14-17, 1991, pp. 2069-2072.
P.J. Rayner and M.R. Lynch, ICASSP 90 vol. 2 $S_2$ VA, Speech Processing 2 VLSI Audio and Electroacoustics, Complexity Reduction in Volterra Connectionist Modelling by Consideration of Output Mapping, Apr. 3-6, 1990, pp. 885-888.
Powell, M.J.D., *Radial Basis Function Approximations to Polynomials*, Proc. Department of Applied Mathematics and Theoretical Physics, *Numerical Analysis*, 1987.
Rayner, P. et al.., "A New Connectionist Model Based on a Non-Linear Adaptive Filer Process," ICASSP89, Apr. 1989.
Schetezen, Martin, *The Volterra and Weiner Theories of Non-Linear Systems*, New York, New York: John Wiley, 1980, Chapter 5.
WebMethods B2B v3.0, "Whitepaper," Oct. 1999, pp. 1-17.
Xue, Q., et al., "Analysis of the Hidden Units of the Multi-Layer Preceptron and its Application in Acoustic-to-Articulatory Mapping," Proc. ICASSP90, Apr. 1990.
"Yahoo! Search," Available from <http://web.archive.org/web/19961128070718/www8.yahoo.com/search.html>, Nov. 28, 1996.
United States Patent and Trademark Office, Non-Final Rejection, Office action mailed Jan. 6, 2004 for U.S. Appl. No. 09/872,242, 12 pages.
United States Patent and Trademark Office, Final Rejection, Office action mailed Jul. 19, 2004 for U.S. Appl. No. 09/872,242, 13 pages.
United States Patent and Trademark Office, Non-Final Rejection, Office action mailed May 6, 2005 for U.S. Appl. No. 09/872,242, 16 pages.
United States Patent and Trademark Office, Final Rejection, Office action mailed Oct. 5, 2005 for U.S. Appl. No. 09/872,242, 22 pages.

* cited by examiner

METHOD AND APPARATUS TO LINK TO A RELATED DOCUMENT

RELATED APPLICATIONS

This application is a continuation application of and claims the benefit of and incorporates in by reference the following U.S. application Ser. No. 09/872,938 filed May 31, 2001, which issued as U.S. Pat. No. 7,272,594 on Sep. 18, 2007.

FIELD OF THE INVENTION

This invention generally relates to Information technology. More particularly this invention relates to linking to contextually similar information in an extensible markup language (XML) document.

BACKGROUND OF THE INVENTION

In the current state of technology, when a user types an uncommon word such as "Alamo" into a query for a search engine or a relational database, then the engine may return a list of irrelevant information as "relevant results" to your query. Relational databases exist where a user can specify a reference document and find relevant related documents to that reference document. A few relational databases exist where a particular field may be pre-designated by the author of the reference document to assist in narrowing a user's query to find relevant related material regarding the reference document. The pre-designated field typically summarizes the main ideas conveyed by the reference document as determined by the author of the reference document. The user of the relational database may choose to use this pre-designated field as the content of the query. However, these relational databases typically return a list of related documents based upon some form of exact word matching.

The prior art technologies may generally lack the ability to allow the user to more narrowly target the desired related documents. The prior art technologies may generally lack the ability to allow the user to more narrowly target a specific aspect of interest in the reference document. The prior art technologies may generally lack the convenience of having an automated link to those related documents. The prior art technologies may generally lack the ability to return a list of related documents that convey a semantically similar idea but use literally different words to convey that idea.

Extensible markup language (XML) is becoming an increasingly popular method of labeling and tagging digital material containing information. Like most tagging schemas, XML suffers from a number of limitations. One limitation of XML is the manual process employed to choose and apply the tags. Not only are tags often chosen manually, which may be a costly process, but also XML has no built in understanding of concepts that are similar to one another. In XML, for example, the tag "automobile" and the tag "car" are wholly unrelated items. Typically, this presents considerable problems, because information from different sources that has been structured using different tagging schema cannot without human intervention be reconciled, even when important conceptual similarities exist. This lack of conceptual understanding may be a considerable handicap to the success of XML becoming the de facto standard for information exchange.

As noted above, an XML document contains a particular schema and tag set. XML tags are defined in an XML schema, which defines the content type as well as the name. The human-readable XML tags provide a simple data format. A particular XML tag may be paired with a value to be a tag-value pair. For example, the tag "vehicle" may be paired with the value "car" to become the tag-value pair of "Vehicle=Car." The XML tag structure defines what the elements contain in the XML document. Unlike, HTML which uses predefined tags, XML allows tags to be defined by the developer of the document. Thus, numerous variables may be put into the tag fields in different schemas. For example in a second XML schema, a user may use the tag-value pair of "Product=Automobile." Each tag-value pair will have a descriptive field filled with unstructured content. For example, "1967 Ford Mustang with two doors, rear wheel drive, and V-8, 5.0 liter engine."

XML tags also fail to highlight the relationships between subjects. Termed "idea distancing", there are often vital relationships between seemingly separately tagged subjects such as for example, "/wing design/low drag/" compared to "/aerofoil/efficiency/". The first category may contain information about the way the wings are designed to achieve low air resistance. The latter category discusses ways in which efficient aerofoils are made. Obviously, there will be a degree of overlap between these categories and because of this, a user may be interested in the contents of both. However, without understanding the meanings of the category names, there is no clear correlation between the two.

Further complications arise when a topic incorporates multiple themes. Should an article about 'technology development in Russia within the context of changing foreign policy' be classified as (i) Russian technology (ii) Russian foreign policy, or (iii) Russian economics? The decision process is both complex and time consuming and introduces yet more inconsistency, particularly when the sheer number of options available to a user is considered. For example, over 800 tags for general newspaper subjects make the task of choosing a potentially basic subject description, in a reasonable timescale, an even more challenging process.

These limitations occur because XML is not a set of standard tag definitions, but XML is a set of definitions that allow individual to define tags. This means that if two organizations are going to interoperate and utilize the same meaning for the same tags, they have to explicitly agree their definitions in advance. The organizations will need to establish a fixed set of field names on each document. The organizations will need to have the entire XML document adhere to that schema. To reconcile these limitation the above tasks, manual tagging, linking, or categorizing of the raw data must be performed prior to perform information operations on the collective raw data.

Related technology, such as a relational database, performs information operations on structured information. However, individuals must manually map the relationships and links of unstructured information in the relational database.

As noted above, XML may assist in facilitating information operations on semi-structured and unstructured information.

In general, structured information may include information possessing structure elements of a data record designed to assist in processing that information by some form of rule-based system that expects specific sets of input values and specific types of fields. Structured information generally lacks contextual text or audio speech information, and consists of fielded/tagged information that adheres to a pre-defined schema or taxonomy. A typical example of structured information is a transaction record for a bank. The transaction record contains fields that have precisely defined allowable values, such as 'name', 'account number', 'amount', 'date', etc., but lacks free-form contextual fields.

Semi-structured information refers to a hybrid system, typified in XML systems. Accordingly, a 'data record' consists of some fields that are compulsory and have definable values, typically from some definable set, and also consists of fields that contain 'free text' or information that is not part of a definable set. Semi structure information may contain textual or audio speech information that contains some defined structured, such as meta tags, relating to the conceptual content of the information. The structure of the information may or may not include tags/meta information that augment the content of the information but usually do not explain or relate to the context of the information. Semi-structured information typically has limited fielded information/meta tagging information relating to how to process the data or where to store/retrieve this information in some taxonomy/indexing system. For example, an XML record has an inherent position within the overall XML data document in which the record resides within.

A typical example of semi-structured information is a news web page that contains a story, title and maybe some category tags that follow a predetermined taxonomy/schema and relate to the content of the document tagged with the information. The tags may contain date information, author information and news provider information, but these meta tags/fields/structured elements do not relate to the context of the content.

Another typical example of semi-structured information is an XML document or XML 'record' that is part of a larger XML data set. The XML record has a definable 'position' within the larger piece of XML. For example, the ACT is structured by defining it as a sub element of a PLAY and giving the ACT a number which enables some information processing to happen based on this structure.

```
<SHAKESPEARE>
    <PLAY>
        <ACT>
            <NUMBER>1</NUMBER>
            <SPEECH>... free text ...</SPEECH>
        </ACT>
        <ACT>
            <NUMBER>2</NUMBER>
            <SPEECH>... free text ...</SPEECH>
        </ACT>
    </PLAY>
</SHAKESPEARE>
```

Unstructured information lacks definable/reliable in/out fields that assist in processing that information, by some form of rule-based system that expects specific sets of input values and specific types of fields. Unstructured information may contain a piece of textual or audio speech information that lacks any defined structured meta tags relating to the conceptual content of the information. Referring to the above example, the actual words in the SPEECH by themselves could be considered unstructured information.

SUMMARY OF THE INVENTION

A method, apparatus, and system exist to generate a ranked list of one or more related documents and a link to each of the one or more related documents. The one or more related documents are ranked based upon relevance to a first representation of content in one or more specified fields of the reference extensible markup language document. The one or more related documents may also be ranked based upon relevance to content in an active desktop window.

BRIEF DESCRIPTION OF THE DRAWINGS

The drawings refer to the invention in which.

Figure 1:
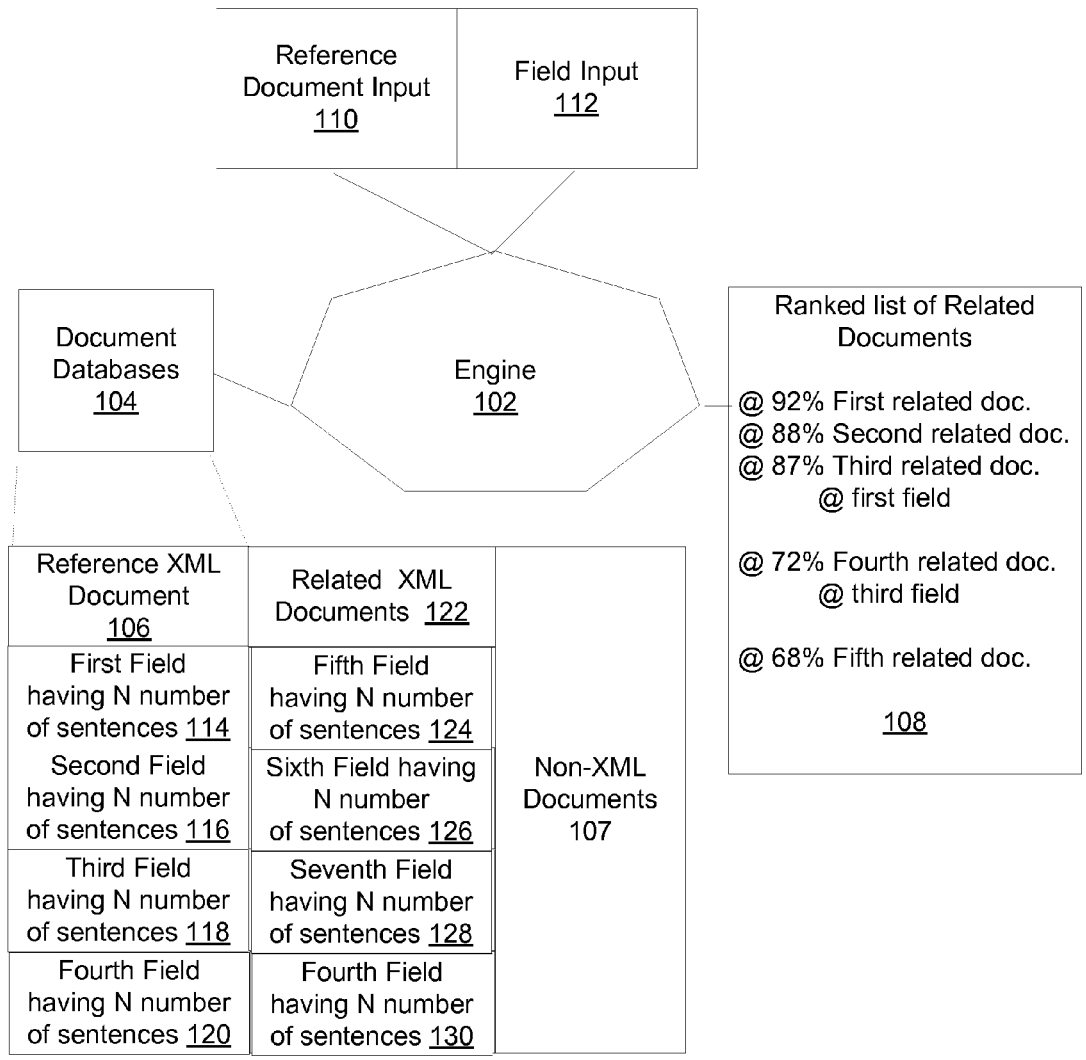
FIG. 1 illustrates a block diagram of an embodiment of a system to generate a ranked list of related documents to a reference document and a link to each of the related documents.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In general, an apparatus is described in which an engine has a document input and a field input. The document input receives a reference extensible markup language document as content for a query. The field input allows a user to specify a particular field in the reference extensible markup language document to use as the content for a query. This allows a user to narrow the scope of the query. The field input also may allow a user to specify a particular field in the related extensible markup language document to search in response to the query. This allows a user to narrow the scope of the search. The engine generates a rank list of related documents to the reference document and an automatic link to the related documents. The engine may be a software or hardware engine.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

FIG. 1 illustrates a block diagram of an embodiment of a system to generate a ranked list of related documents to a reference document and a link to each of the related documents. Referring to FIG. 1, the system 100 includes a engine 102, one or more document databases 104 storing a reference extensible markup language (XML) document 106, related XML documents 122, as well as non-XML documents 107, and a ranked list of related documents 108 ranking the relevance of one or more related XML documents 122 to the reference XML document 106 based upon their similarity to the content in the reference XML document 106.

The engine 102 has a reference document input 110. In an embodiment, the reference document input 110 allows a user to select the reference XML document 106 from any of the documents, XML documents and non-XML documents, in the one or more document databases 104. The non-XML documents 107 may be converted to an XML format and thus be selected as a reference XML document 106 or included in a search of related XML documents 122 to the reference XML document 106. In an embodiment, the non-XML documents 107 may include content associated with an e-mail, content associated with a web page, content associated with a software application such as a word processing document, or any other similar non-XML document. The one or more document databases 104 may include one or more databases stored in a local hard drive. Also, the one or more document databases 104 may include or one or more databases accessed through network connection such as a server farm or content on the World Wide Web. The content may include the text in the document, the header of the document, and any other information somehow related to the document.

In an embodiment, the user may also submit a document to the reference document input 110 as the reference XML document 106 rather than selecting the reference XML document 106 from the one or more document databases 104. If the document submitted by the user is a non-XML document, then the non-XML document may be converted to an XML format by a content converter to XML module (not shown).

The engine 102 may also have a field input 112. In an embodiment, the field input 112 allows a user at the time of generating the query to specify a particular field 114-120 in the reference XML document 106 to use for the query. If the user chooses to specify a particular field, such as the third field 118, then the user may narrow the scope of the query to content associated with the third field 118 in the reference XML document 106. Thus, if the user was only interested in finding related material to particular aspect of the reference XML document 106, then the user may narrow the scope of the query to the particular field 114-120 containing that content.

The field input 112, may also allow the user to specify a particular field 124-130 in the related XML documents 122 to be searched in response to the query. If the user chooses to specify a particular field in the related XML documents 122, such as the sixth field 126, then the user may narrow the scope of the search to content associated with the that particular field, such as the sixth field 126, in the related XML documents 122. Thus, if the user is already familiar with the related documents and the desired relevant material is always located in a specific field, such as the sixth field 126, then the user may more narrowly tailor the scope of the search to a particular field 124-130 in the related XML documents 122. As noted above, non-XML documents 107 may be included in the related XML documents 122 by simply converting them to an XML format.

In an embodiment, each reference XML document 106 has one or more fields, such as a first field 114, a second field 116, a third field 118, and a fourth field 120. In an embodiment, a field 114-120 may define a unit of data on a source document. Examples of fields 114-120 may be NAME, ADDRESS, DESCRIPTION, QUANTITY, and AMOUNT DUE. Each field 114-120 may contain information in the form of one or more sentences of unstructured text. In an embodiment, the unstructured text may be a description, such as "1967 Ford Mustang convertible with a 122 cubic inch V-8 engine." Similarly, each related XML document 122 may contain one or more fields, such as a fifth field 124, a sixth field 126, a seventh field 128, and an eighth field 130. Each of those fields 124-130 may contain similar information in the form of one or more sentences of unstructured text.

In an embodiment, the documents stored in the document databases 104 may be multifaceted extensible markup language documents. A multifaceted extensible markup language document contains material relating to several different subject areas. For example, an article about technology development in Russia within the context of changing foreign policy may be categorized in the subject area of (i) Russian technology (ii) Russian foreign policy, or (iii) Russian economics. Thus, the engine 102 may generate a ranked list of related documents 108 relating to a particular subject area from a particular field 114-120 of a multifaceted XML related document based upon a first representation of either the reference XML document 106 or optionally a particular field 124-130 within the reference XML document 106.

In an embodiment, the engine 102, may execute a query on the content associated with the reference XML document 106 in order to generate the ranked list of related documents 108 without a user having to request the query on the reference XML document 108. The user may select the active window on the user's computer to be the database containing the reference XML document 106. Thus, the user may be reading an e-mail or browsing a new article, and the engine generates a ranked list of related documents 108 to the content associated with the e-mail or news article.

The engine 102 generates a ranked list of related documents 108. The ranked list of related documents 108 may display the a title or description of the related document, an indication of how relevant the related document is compared to the first representation, and an automatic link, such as a hypertext link, to the related XML documents 122. The relevance of the related XML documents 122 and optionally the particular field 124-130 within the related XML documents 122 is based upon similarity to a first representation of content associated with the reference XML document 106. In an embodiment, the relevance of the related XML documents 122 and optionally the particular field 124-130 within the related XML documents 122 is based upon similarity to a first representation of content associated with a particular field 114-120 within the reference XML document 106.

In an embodiment, the first representation incorporates the context of key concepts and terms from the content under analysis by the engine 102. The first representation includes a set of terms as well as one or more weighted values associated with each of those expressions in the set of terms. In an embodiment, the set of terms includes single words, higher order terms, noun phrase, proper names and other similar terms. As will be described later, the engine 102 then determines the relevance and relational probabilities between the key terms and concepts from the content chosen for the reference XML document 106 and the content chosen for the related XML documents 122. As noted, in an embodiment, the chosen content may be associated with a specific field with a document, the chosen content may be associated with two or more specific fields with a document, or the entire document. The engine 102 repeats the comparison for similarity between the first representation for the reference document and the representations for all of the related documents. The engine then generates the ranked list of related documents 108. In an embodiment, the engine 102 may create a representation for new content under analysis or retrieve a representation from a database of representations (not shown) for content already analyzed.

Figure 2A:
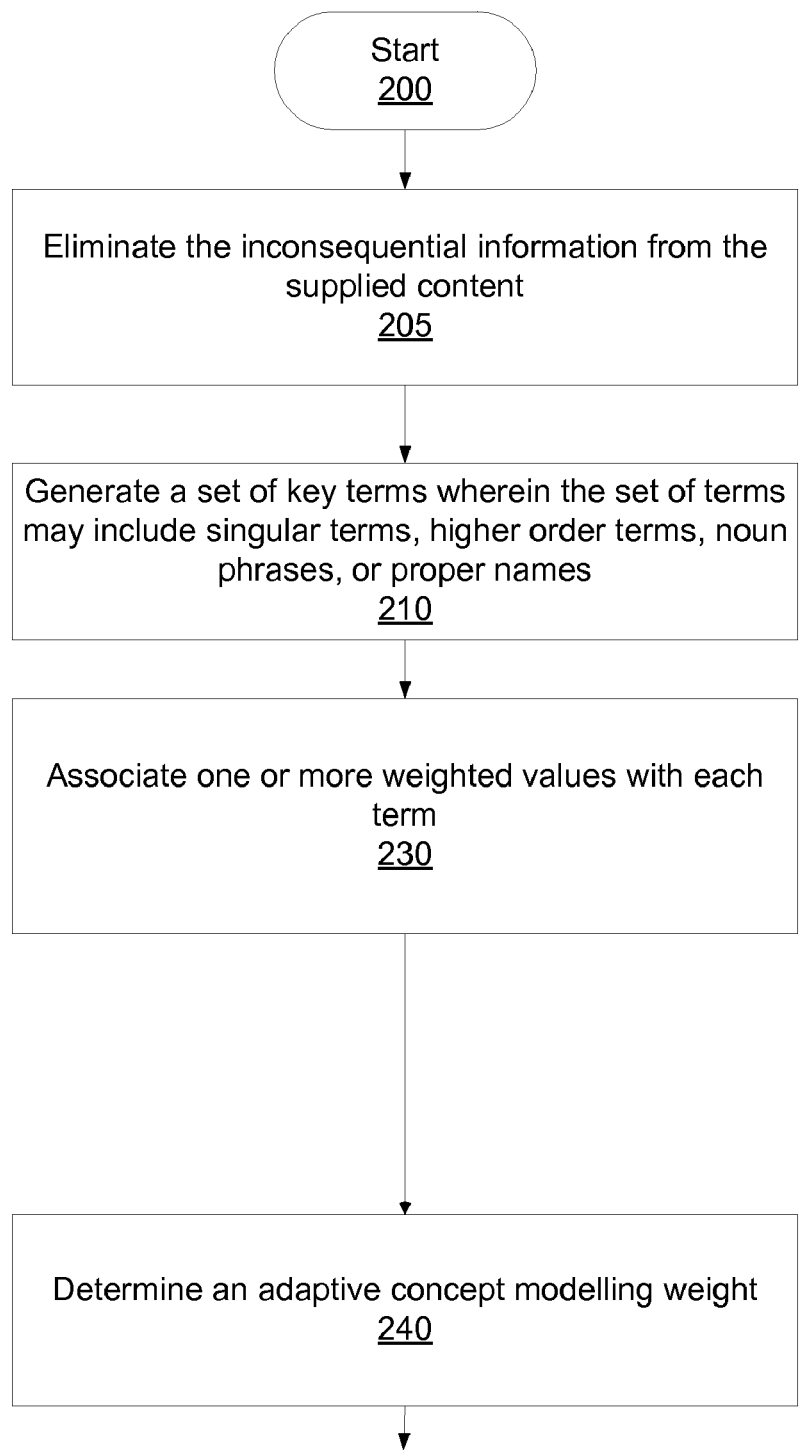
FIG. 2a and FIG. 2b illustrate an embodiment of flow diagram of a process for creating a representation of content in an extensible markup language document.
Figure 2B:
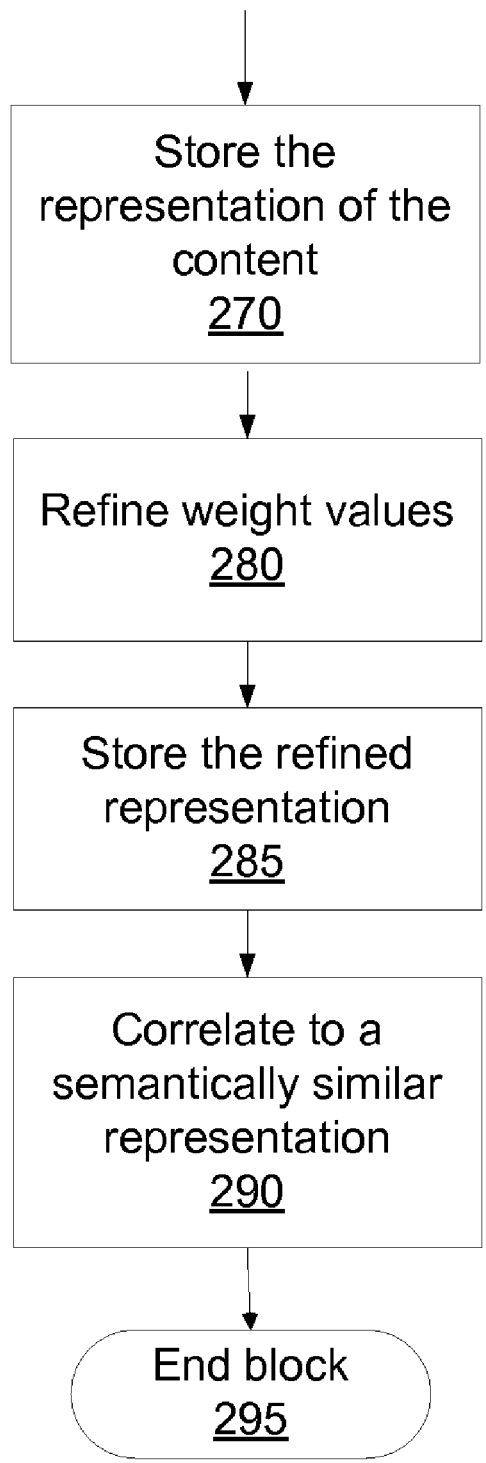

FIG. 2a and FIG. 2b illustrate an embodiment of flow diagram of a process for creating a representation of content in an extensible markup language document. The process starts by analyzing content in an extensible markup language document which may include unstructured information in the content.

In block 205, an engine may use stop lists, grammar modeling techniques, and other similar techniques to eliminate inconsequential information from the supplied content. The engine eliminates the trivial information in a sentence to leave the main terms of the sentence. In an embodiment, the engine streamlines all of the content in this manner.

In block 210, the engine eliminates redundant terms in a corpus of terms contained within the content by using a first algorithm to generate a set of key terms. In an embodiment, the engine uses Shannon's information theory to eliminate the redundant terms.

In block 230, the engine associates one or more weighted values with each term in the set of key terms. The engine uses information theoretic algorithms and Bayesian algorithms to determine statistics for each term within the supplied content. In an embodiment, the set of teems may include single terms, higher order terms, noun phrases, proper names, and other similar types of information. In an embodiment, for a given key term the engine produces multiple statistics associated with each term. The statistics include position information, those derived from the frequency of occurrence and other statistical information associated with the key terms, at both the document and corpus level. The engine also uses Bayesian algorithms to derive an importance for each term. In an embodiment, terms may also have their weighted values modified by statistical correlation.

For example, the term "car" is a common term and would be assigned a high frequency derived value. The term "turnip" is very rarely used term and would be assigned a low frequency derived value. The next higher order of this combination of terms, "turnip car," is extremely rare and would be assigned a very low frequency derived value. In comparison, the term "sport" is a common term and would be assigned a high frequency derived value. The next higher order combination of the terms, "sport car," is common and would be assigned a high frequency derived value.

In block 240, in an embodiment, for each term, the engine calculates an Adaptive Concept Modeling Weight from the multiple statistics associated with each term.

In block 270, the engine stores the representation of the content, the representation containing the set of key terms from the content and the one or more weighted values associated with each term in the set of key terms. The engine creates a representation, or sometimes referred to as a concept, of both the content associated with the reference XML document and each related XML document analyzed. The engine combines its knowledge of the content, the information conveyed by the XML schema associated with the content, and similar representations stored in the representation database to create the representation of the content supplied to document input and the content from the related documents. The representation of each document analyzed is based upon the content including the unstructured information associated with the field. In an embodiment, the engine creates a representation for the content in each field of the XML document. In an embodiment, a representation exists for the individual tag-value pairs associated with the document and a representation exists for the overall document.

In block 280, the engine may compare the key terms from a first instance of the representation to key tennis within historical representations. The engine may refine the weighted value associated with each key term in the first instance based upon the comparison.

In block 285, the engine stores the refined representation. In an embodiment, the engine stores the refined representation in a database of representations.

In block 290, the engine identifies and correlates the similarity between the representation for the reference document and the representation for a related document. The correlation includes semantically similar sets of terms contained in both of the representations. Semantically similar set of terms convey roughly the same idea contain but literally different terms. In an embodiment, the engine inserts an internal XML tag-value pair to representations while allowing the representation to keep its original tag-value pair. The engine inserts the internal tag-value pair based upon the nearest category in value to the first value associated with the representation. This assists in creating a common internal XML tag-value pair regarding a particular topic regardless of the actual tag-value pair assigned to the content or the exact words used to convey the concepts in the content. In an embodiment, the engine inserts links and pointers into the representation to known similar topics and information. In an embodiment, the engine inserts a link to a stored model of the content in the XML field description. In an embodiment, the engine updates representations related tag-value pairings.

In block 295, the engine repeats this process for the next piece of content under analysis.

Figure 3:
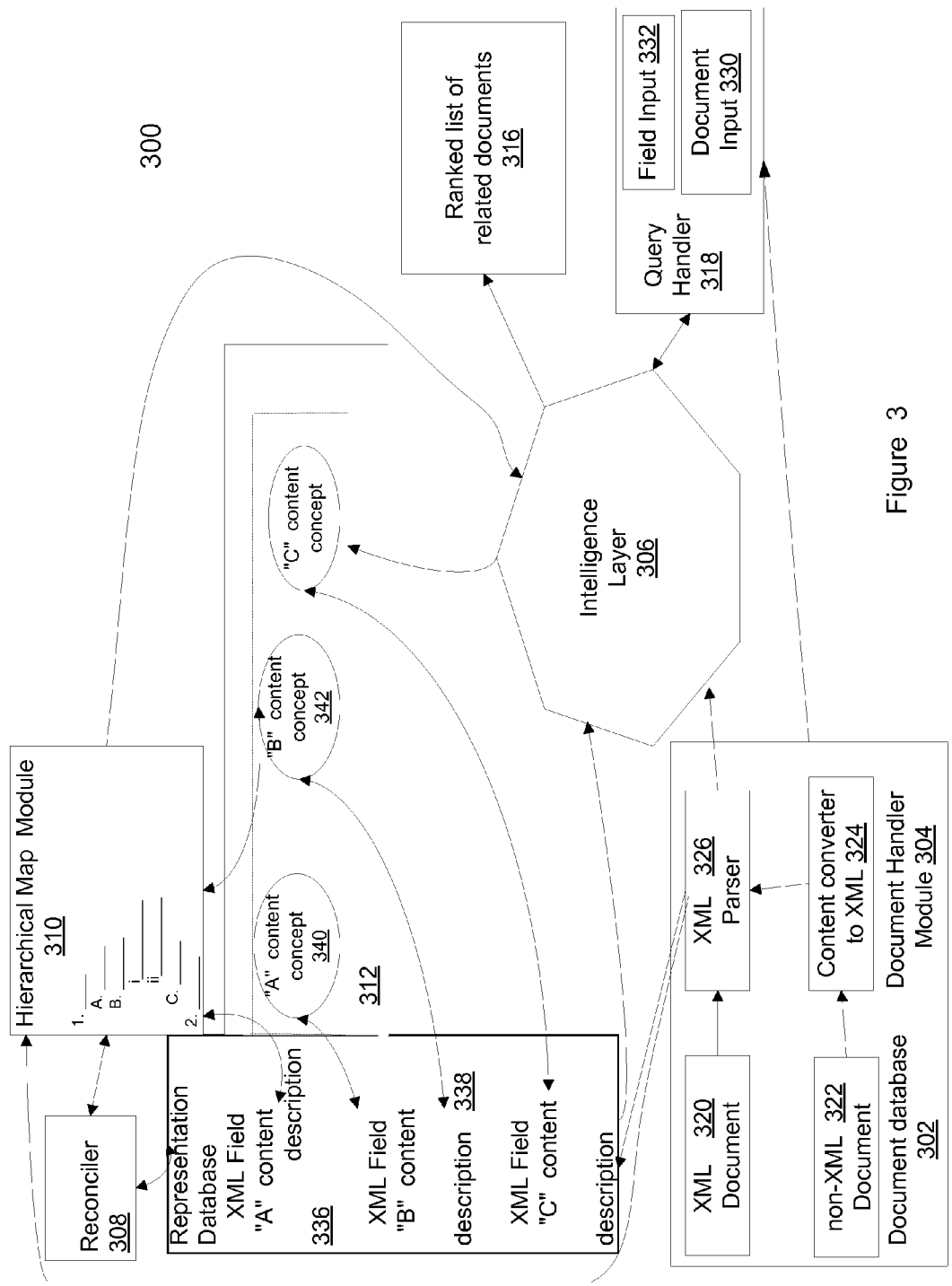
FIG. 3 illustrates a block diagram of an embodiment of an apparatus to generate a ranked list of related documents to a reference document and a link to each of the related documents.

FIG. 3 illustrates a block diagram of an embodiment of an apparatus to generate a ranked list of related documents to a reference document and a link to each of the related documents. In an embodiment, the system 300 includes a document database 302, a document handler module 304, an intelligence layer 306, a reconciler 308, a hierarchical map module 310, and a representation database 312. The system 300 also includes a ranked list of related documents 316 and a query handler 318.

A document from the document database 302 may be delivered into the document input 330. The document may be selected from an existing XML document 320 or non-XML document 322. Also, the user through the document handler module 304 may supply a document to the document input 330. Thus, the input document may be either a document from the document database 302 or a document supplied by the user to be the content for the document input 330. The document submitted to the document handler module 304 can be an XML document or a non-XML document.

If the document is not in an XML format, then the input document is sent to a content converter 324 located in the document handler module 304. The content converter 324 converts the input document to an XML format.

An embodiment of the content converter 324 module uses pattern recognition type software to automate the generic categorization and XML-tagging of the unstructured, non-XML document. Next, if the input document is an XML structured document 320, or after a non-XML-structured document 322 has been converted to an XML structure, then the XML document is parsed by an XML parser 326.

The XML parser 326 contains software that reads an XML document, identifies the XML tags, and changes the XML tags and the hierarchical information of the XML document into information accessible to a programming language. The identification of all the XML tags allows an action to be taken on each element of an XML document. The XML parser 326 sends the parsed XML document to the hierarchical map module 310, the representation database 312, the intelligence layer 306, and to the document input 330 of the query handler 318.

The hierarchical map module 310 receives the parsed XML document. The hierarchical map module 310 stores a model of the original hierarchical structure of the XML document or converted non-XML document. For an example of an hierarchy of a document, a particular play may contain multiple acts, each act may contain several scenes, and each scene may one or more speeches by a particular character in the play. The hierarchical map module 310 analyzes the original hierarchical structure of the original XML document 320 or converted non-XML document to determine the purpose of the tagging schema and the related information. The hierarchical structure provides some indications of the tag meaning. The hierarchical structure can also provide some indications of the meaning of the content associated with the tag. For example, content occurring in a section heading of the hierarchical structure has a different meaning from content occurring in a footnote of the same hierarchical structure of the same document. Similarly, the content in a figure caption has different hierarchical structure than content in a database, table, etc.

The hierarchical map module 310 then stores the analyzed model of this particular XML document. The hierarchical map module 310 sends this model to the intelligence layer 306. The hierarchical map module 310 also sends this model to the reconciler 308 in order to assist in determining an understanding of the various elements of the XML schema such as tags, content, etc. as will be described in more detail below. The reconciler 308 assists in determining a cross-reference between different elements of the XML schema that have a similar conceptual meaning. Thus, the hierarchical map module 310 assists in supporting multiple concurrent content sources each source having a different schema, with information from each source being able to retain its inherent structure.

Next, the intelligence layer 306 analyzes the content of the parsed XML document. The intelligence layer 306 compares the representation of the concepts embodied in the content of the parsed XML document are compared to the representations stored in the representation database 312. In an embodiment, if a representation, or sometimes referred to as a concept, from the parsed XML document is not in already in the representation database 312 then the representation is added to the representation database 312. If a representation from the parsed XML document is already in the representation database 312, then the intelligence layer 306 dynamically refines the instance of the representation by comparison to a historical instance of the same representation in the representation database 312. The intelligence layer uses the historical weight values of each term in the representation to refine the weight values in the current instance of the same representation. The refined instance of the representation is then stored in the representation database 312 along with the historical instance of the representation.

In an embodiment, the intelligence layer 306, such as a dynamic reasoning engine, uses a combination of the following techniques to analyze the content of the parsed XML document in order to extract the concepts embedded within the content. The following techniques are described in greater detail later. In an embodiment, the intelligence layer 306 analyzes words as a value in sequences of algorithms to compare the relational probabilities between word clusters. In an embodiment, the intelligence layer 306 can also use an inverted word list in a well-known manner to assist in relational probabilities. In an embodiment, the intelligence layer 306 may use pattern-matching techniques. In an embodiment, the intelligence layer 306 may also use human language and grammar modeling to assist in determining the category of the content and to extract the concepts embedded within the content.

The intelligence layer 306 can use any or all of above techniques to determine 1) which particular combination of concepts do occur within a document under analysis in question and 2) based upon the particular combination of concepts that do occur within the document in question, then the intelligence layer 306 may estimate that the document in question relates to t a specific subject. In this manner, intelligence layer 306 extracts a document's conceptual essence and encodes the unique "signature" of the key concepts. Based upon the combination of these technologies, the intelligence layer 306 may enable a computer to understand that an X percent of probability exists that the content under analysis is about a specific subject. In an embodiment, the intelligence layer creates a representation for each field in the document under analysis. Therefore, a multifaceted XML document is analyzed the same way as single subject XML document is analyzed.

As noted above, in an embodiment, the intelligence layer 306 uses the following techniques: inverted word lists; Adaptive Probabilistic Concept Modeling; and pattern matching techniques.

In an embodiment, one of the techniques the intelligence layer 306 uses is an inverted word list. An inverted word list is a data management file that is indexed on many of the attributes of the data itself. The inverted word list points to other words which contain similar meaning or context as themselves.

In an embodiment, one of the techniques the intelligence layer 306 uses is Adaptive Probabilistic Concept Modeling. Adaptive Probabilistic Concept Modeling analyzes the correlation between features found in relevant documents to determine higher relevance concepts and documents. Concepts important to sets of documents can be determined to allow new documents to be accurately classified. In an embodiment, the intelligence layer 306 may use multiple algorithms, such as the Volterra series and Linear Weight Networks, to determine the key terms and concepts contained within the document. The intelligence layer 306 identifies these key concepts in the document along with the associated frequency and relationship of terms most closely correlated with each key concept. In an embodiment, the key concepts and correlations are stored in the representation database 312 as representations. The representations are software abstracts that can then be used to locate other instances of the pattern of terms and contextual relationships that represent a given idea.

The intelligence layer 306 then uses the derived understanding of the instance of the representation to further refine the historical instance of the representation. Thus, the effectiveness of the refinement with the historical instance of the representation improves over time as their focus on a specific topic becomes more comprehensive and sophisticated. A historical instance of the representation can become skilled at recognizing a relevant topic independently of the words used to describe the particular idea.

In an embodiment, the intelligence layer 306 may also use the technique of pattern-matching (non-linear adaptive digital signal processing), utilizing Bayesian Inference and Claude Shannon's principles of information theory. The intelligence layer 306 identifies the patterns that naturally occur in text, based on the usage and frequency of words or terms that correspond to specific ideas or concepts. Based on the preponderance of multiple patterns over another in a portion of unstructured information, the intelligence layer 306 can determine that there is particular probability that a document in question is about a specific subject. In this manner, the intelligence layer 306 may extract a document's conceptual essence, encode the unique "signature" of the key concepts, and then enable a host of information operations to be performed on the document automatically.

Bayesian Inference centers on calculating the probabilistic relationship between multiple variables and determining the extent to which one variable impacts another. A typical problem is to judge how relevant a document is to a given query or user profile. Bayesian theory aids in this calculation by relating this judgment to details that we already know, such as the model of a user. More formally, the resulting, "a posteriori" distribution $p(\theta|\chi)$, which is applicable in judging relevance can be given as a function of the known "a priori" models and likelihood $$P(\theta|\chi) = \frac{P(\chi|\theta) * P(\theta)}{\sum_{\theta' \in \Theta} P(\chi|\theta') * P(\theta')}$$

Extensions of the Bayesian Inference theory go further than the relevance of the information for a given query against a text. The results of such algorithms determine the correlation between features found in documents relevant to a user profile, finding new concepts, and other related documents.

Shannon's Information Theory is a mathematical foundation for digital communications systems. Shannon's Information Theory allows "information" to be treated as a quantifiable value in communications. Consider the basic case where the units of communication (for example, words or phrases) are independent of each other. If $p_i$ is the probability of the $i^{th}$ unit of communication, the average quantity of information conveyed by a unit, Shannon's entropy or measure of uncertainty is:

$$w_{INN}{}^t = (0\ 0\ 0\ 0\ 1\ 1)$$

This formula reaches its maximum when the probabilities are all equal; in this case, the resulting text would be random. If this is not the case, the information conveyed by the text will be less than this maximum; in other words, there is some redundancy. This result is then extended, by more sophisticated mathematical arguments, to when units are related.

Human languages contain a high degree of redundancy. A conversation in a noisy room can be understood even when some of the words cannot be heard; the essence of a news article can be obtained by skimming over the text. Information theory provides a framework for extracting the concepts from the redundancy.

In an embodiment of the intelligence layer 306, as the frequency of a unit of communication is reduced, the amount of information that unit of communication conveys is increased. Therefore, the ideas that are more rare within the context of a communication tend to be more indicative of the idea's meaning. This theory assists the intelligence layer 306 in determining the most important (or informative) concepts within a document.

Language and grammar modeling techniques may also be employed to assist in identifying the key concepts embedded in a document. The intelligence layer 306 treats words as abstract symbols of meaning, deriving its understanding through the context of their occurrence rather than a rigid definition of grammar. The intelligence layer 306 contains a statistical understanding of the patterns of most human languages, and can be easily trained on the patterns of any language. In an embodiment, the intelligence layer 306 may be refined to work with content in any human language of the user's choice.

The intelligence layer 306 may also use a few language-specific options to fine-tune its performance.

The intelligence layer 306 may employ stop lists. In every language there are "empty words", which on their own do not carry any significant meaning. In grammatical terms these would normally be prepositions, conjunctions, auxiliary verbs, etc. In English for example, words such as "the", "a", "and", "to", etc.

A stop list assists the intelligence layer 306 in ignoring such type of words. This results in faster processing and less use of memory and storage capacity, as stop list words do not need to be stored. In an embodiment, due to the eventual results of the combined technologies being based on statistical analysis, strictly speaking, stop list configuration is not necessary but it helps. Such words will obviously differ depending on the human language used. In an embodiment, the intelligence layer 306 includes a set of stop lists for most commonly used human languages.

The intelligence layer 306 may also employ stemming. In most languages, certain forms of a word can be stripped or converted to obtain the main stem or core of the word or base word. In English for example, run, runner and running could all be stripped down to the word stem word "run", without significant loss of meaning. The intelligence layer 306 has the ability to use stemming to further enhance concept determining.

The intelligence layer 306 may also employ word breaking. Certain human languages, such as That, Japanese, Chinese, etc. have text in which sentences are written without the use of spaces to delimit individual words. The individual words are normally discerned by its context. In an embodiment, the intelligence layer 306 is mostly language-independent, in that the intelligence layer analyses word patterns in a particular context, yet the intelligence layer 306 still has to know what the individual word is. In such circumstances, intelligence layer uses a word-breaking application programming interface (API) to perform this block.

The intelligence layer 306 may make use of computer linguistics, keywords, pattern matching algorithms and probability theory to automating the processing of unstructured information. Further, the intelligence layer 306 receives inputs from the representation database 312 and the hierarchical map module 310 that assist the intelligence layer 306 in understanding the content, the purpose of each tag, the tagging schema, as well as the tag and the corresponding related information. The intelligence layer 306 may then compare the relational probabilities from all these techniques to determine the ideas conveyed by the content.

In an embodiment, the intelligence layer 306 may use all of the above techniques while generating a representation. In an embodiment, the intelligence layer generates a representation for each field in an XML document. The XML document may be either the reference XML document or one of the related XML documents. The representation may consists of two parts 1) a stored portion of the key terms and weights associated with each tend and 2) a link to the stored portion of the XML Field content description. The descriptive content of a field within the XML document is input to the intelligence layer 306. Then, the intelligence layer 306 compares key terms from this instance of the representation to the key terms from all other instances of the field having the same tag-value pair in the representation database 312. Once the intelligence layer understands that the content associated with the field relates to a particular subject matter the intelligence layer 306 may automatically assign a tag-value pair to the representation. The intelligence layer 306 automatically inserts the appropriate XML tags to each representation. The intelligence layer 306 can also link the content concepts (terms and mathematical weights) and content field representations to cross-reference each other. This ensures that all of the representations relating to the same subject matter will have a common tag-value pair.

Each instance of a representation having the same tag-value pair may have differing key terms from descriptive content associated with that instance of the tag-value pair. For example, a first tag-value pair of "Vehicle=Car" may have the associated content of "1967 Ford Mustang with four doors, rear wheel drive, and V-8 5.0 liter engine." A second tag-value pair of "Vehicle=Car" may have the associated content of "1988 Ford Taurus with rear wheel drive, V-6 3.0 liter engine, and air conditioning." Note, the unstructured content descriptions may contain many more terms than these short examples. In an embodiment, the more frequent a key term appears in the descriptive fields of these common tag value pairs, the more relevant and higher assigned weight that word/term has in the historical representation of that tag-value pair.

The intelligence layer 306 contributes to the automatic categorization and cross-referencing of information, thereby dynamically improving the efficiency of information retrieval and enabling the dynamic personalization of digital content. The intelligence layer's 306 conceptual understanding of content in an XML document enables the intelligence layer's 306 to automatically insert XML tags and links into documents, based on the concepts contained in the information. This eliminates the manual cost. Also, the intelligence layer 306 enables XML applications to understand conceptual information, independent of variations in tagging schemas or the variety of applications in use. This means, for example, that legacy data from disparate sources, tagged using different schemas, can be automatically reconciled and operated upon. This reduces human error in cross-referencing content.

In an embodiment, an increase in efficiency of information retrieval and enabling the dynamic personalization of digital content occurs because the intelligence layer 306 performs all four of the functions, contextual analysis, concept extraction, automatic categorization, and cross-referencing of information.

In an embodiment, the intelligence layer 306 uses a set of examples of documents within specified categories to assist in categorizing a particular XML field content description or content concept user. The intelligence layer 306 then determines which categories the new documents will best fit into, categorize them accordingly and add the requisite XML tags. All of this is done automatically and in real time. The representation database 312 then stores the tagged XML files into a particular file repository based on matched category.

The representation database 312 consists of XML field content descriptions 336-338 and content concepts of those XML field content descriptions 340-342. The representation database 312 receives data from the XML parser 326. The representation database 312 sends data to and receives data from the intelligence layer 306, the hierarchical map module 310, and the reconciler 308. As illustrated, the representation database 312 stores representations of XML field content descriptions 336-338 and content concepts 340-342 of those XML field content descriptions. For example, the content map module may store a representation consisting of XML field "A" content description 336 and the "A" content concept 340. In an embodiment, a representation consists of both an XML field content description and a content concept. In an embodiment, the representation database 312 stores these representations for all of the content descriptions in the different elements within the XML/converted XML document.

The representation database 312 receives each block of unstructured information within a parsed XML document from the XML parser 326. The representation database 312 sends each block of unstructured information within an XML document to the intelligence layer 306 for analysis. The intelligence layer 306 automatically marks the data with an XML tag and any cross-referencing information. These XML tags enable information to be reused and maintained and to create an internal common categorization of the semi-structured and unstructured information. The intelligence layer 306 sends back an assigned representation which the information fits within. The representation database 312 stores a representation of the information blocks and stores the representations of each block of unstructured information within an XML document. The reconciler 308, hierarchical map module 310 and intelligence layer 306 may all refer to these representations while performing their operations.

The hierarchical map module 310 stores a model of the original hierarchical structure of the parsed document. In an embodiment, all of the representations contain cross-referencing links to each other.

Through the use of the intelligence layer 306, representation database 312, hierarchical map module 310, and reconciler 308, a computer system can be enabled to automatically form an understanding of a page of text, web pages, e-mails, voice, documents and people and automate operations on the information from these various sources.

The query handler 318 has a document input 330. The document input 330 allows the user to submit a document through the document handler module 304 or select an existing document from the document database 302 as the reference document. The intelligence layer 306 may determine documents that are relevant to the content under analysis by comparing the instance of the representation for the content associated with the reference document to all other instances of representations having the same common tag-value pair stored in the representation database 312. The intelligence layer 306 may also compare the content under analysis to representations that are close in idea distance. The intelligence layer 306 may also compare the content under analysis to representations dynamically created for documents stored in the document database 302. The intelligence layer 306 may also compare the content under analysis to representations that have been linked as similar in content to the tag-value pair under analysis.

The relevant documents are ranked corresponding to their similarity to the representation of the query. This includes representations that are semantically similar to the representation for the reference document. Then, the results of the ranked, relevant documents are sent to the ranked list of related documents 316. The ranked list of related documents 316 may also contain a hot link, such as a hyperlink to each related document.

The field input 332 allows a user or the application used by the user to specify which field in either or both the reference XML document and the related XML documents to be analyzed for relevant content. In an embodiment, the user may specify at the time the query is generated the particular field in an XML document to use as the content of the query. In an embodiment the user may specify multiple fields of interest. The field input 332 grants the user the ability to target their search and response to the search to the exact type of information sought.

Thus the user may eliminate an overbroad return of non-relevant information by specifying the particular field or particular fields of interest that the user wishes to use as the query or include in the search. Since the system 300 uses concepts in the content of the query rather than the exact key words, the system 300 then generates a ranked list of related documents 316 containing the most salient information to the content submitted to the document input 330. The content the system 300 analyzes may be a sentence, paragraph or page of text, the body of an e-mail, a record containing human readable information, or the derived contextual information of an audio or speech snippet.

The reconciler 308 exchanges data with the hierarchical map module 310 and the representation database 312. The reconciler 308 uses a routine to check to see if the schema of a first parsed document should be cross-referenced with the tagging schema of a second parsed document. The reconciler 308 provides schema reuse, so that tags referenced in one schema can be used in other schemas, by providing an input into the intelligence layer 306 to automatically insert the appropriate links. Thus, the reconciler 308 allows documents having different XML schemas to be fed into the system. In an embodiment, the system 300 gains a conceptual understanding of each schema and the content within each tag-value pair in order to make each schema the equivalent. Thus, the system 300 then automatically assigns the representation within the appropriate internal representation. This means, for example, that legacy data from disparate sources, tagged using different schemas, can be automatically reconciled and operated upon. Different schemas may use different nomenclature for tag names. For example, a structure that contains "Customer/name/last" and "Customer/name/family" could be mapped together by the reconciler 308 because last name and family name are semantically the same.

In an embodiment, the intelligence layer 306 may use pattern-matching algorithms as follows.

A document maybe viewed as a vector. One way of posing the problem is to consider the document in a high dimensional space, each dimension of which is associated with a term from the corpus (the total group of documents). A document can be represented in this space as a point the coordinates of which arise from the presence or absence of each of the corpus terms in the particular document. This leads to a very high dimensionality space, as there are many tens of thousand of terms in a practical corpus. In practice, it is not necessary to use all the terms from a corpus, as many terms such as 'the' are so common as to lend little to the solution of the problem. Typically schemes operate on the rarer words present in a document on the term infrequency basis; that is, rarer words are more likely to carry the meaning of the document. It is only these rarer terms that are used. Various other ad hoc term selection schemes are in use. Other term related indices such as the frequency of the term or inverse frequency of terms in a document may be represented in space as the point. In an embodiment the terms may be a single term, high order term, noun phrases, proper names, etc.

On this basis, a document or tag-value pairs can be compared by looking at the distance in this space between the points representing each document or tag-value pair. This is an example of a vector-based technique. However, looking at the distance in this space between points representing documents or tag-value pairs is only one method to employ a Vector based method. Representations can also be compared in a similar manner.

Higher Order Terms

Often it is not individual terms that convey meaning but combinations of these terms. Often one term acts as a qualifier and changes the meaning of another term present. For example the term 'cat' with no a priori information is probably something to do with felines; however in the presence of the term 'burglar' its meaning in effect changes. Such combinations are higher order terms. Use of a higher order term may remove some term dependence and term independence assumptions that are typically made.

Using * to denote an operator, such a combination of terms for a document such as:

"the dog, the cat and the burglar"

may be represented based on order as:

$1^{st}$ order 'cat', 'dog', 'burglar'

$2^{nd}$ order 'cat*dog', 'cat*burglar', 'burglar*dog', 'cat*car', 'cat*dog'

$3^{rd}$ order 'cat*burglar*dog'

With a reasonable number of terms, it is clear the number of higher order terms can explode rapidly.

Concepts and Terms

The concept of higher order terms may be efficiently extended by, rather than operating on all higher order combinations, grouping higher order terms into concepts and then defining these concepts as new terms in the process in their own right. Whilst being efficient, identification of these concepts is non-trivial. For example, if a new concept term A1='Cat*burglar' is considered, then the higher order mixed term A1*'police' may be found to be useful.

Conceptually, the problem is one of theoretically starting with all terms, generating higher order terms and selecting only those for the classifiers which contribute most to accurate results. Such an approach is an example of self-structured pruning of the recognition space.

The representation of weighted terms and higher order terms can be expressed as a Volterra series.

An Exemplary Algorithm

In adaptive term modeling, it is important to eliminate the need for a priori information, as the non-linear relationships necessary to perform many of the problems addressed are too complex in general to be adequately described explicitly.

In one embodiment, a model is created which is as general as possible. This increases and potentially optimizes its performance through the adaptive process on training data, to remove problem specific structural redundancies in the network structure, in order to reduce computational load.

In order to perform a general transfer function, a very large number of terms from the Volterra series may be needed. Experience has shown that many real problems may however be solved with limited order networks of order one or two. It has also become apparent that it is very difficult to predict in advance which terms will be irrelevant and remove them. Thus, the problem is to identify the redundant terms and remove them and so restructure the network.

Linear Weight Networks

They are composed of a non-linear expansion operation on the input document vector x to give an extended vector v containing higher order terms and concepts. This may be represented below as:

$$v=F(x)$$

with F(x) being the non-linear space extending function. In the Volterra case, the vector may be written in the form of a polynomial expansion, such as follows:

$$v^t=(1,x_1,x_2,x_1x_2,x_1^2,x_2^2,x_1^2x_2,\ldots)$$

A weighted linear sum using a set of weights w is then performed in the extended space to give the output y, which may be subtracted from the desired output d to give an error $\epsilon$ as follows:

$$\epsilon=d-y=d-w^t v$$

It can be shown that the mean square error is:

$$E[\epsilon^2]=E[(d-w^t v)]=\sigma^2-2w^t p+w^t R w$$

where R is the autocorrelation matrix of the data in the non-linearly extended vector space, similarly P is the cross correlation vector between the desired d signal and the non-linearly expanded data, and $\sigma^2$ is the variance of the desired response.

In general for the pattern recognition problem in which the network is performing well, the network is degenerate or rank-deficient. That is, R is singular or near singular.

A single solution may still be obtained by the application of Singular Value Decomposition theorem, which states:

For matrix A of rank q, there are two unitary matrices X and Y such that:
where:
and:

$$\text{where}: Y^H A X = \begin{pmatrix} \Sigma & 0 \\ 0 & 0 \end{pmatrix} \text{ and}:$$

$$\Sigma q = diag(\sigma_1, \sigma_2, \ldots, \sigma_q)$$

$$\sigma_1 \geq \sigma_2 \geq \ldots \geq \sigma_q > 0$$

This theorem can be used to solve for the weight vector even when R is singular. More generally, the weight equation may be rewritten:

$$w=A^m b$$

where $A^m$ is the Moore-Penrose generalized inverse or pseudoinverse of matrix A. Singular Value Decomposition can give a unique solution to the equation, giving the one solution with the minimum-norm.

The pseudoinverse of the matrix A may be defined as:
where:

$$A^m = X \begin{pmatrix} \Sigma^{-1} & 0 \\ 0 & 0 \end{pmatrix} Y^H \text{ where}:$$

$$\Sigma^{-1} = diag(\sigma_1^{-1}, \sigma_2^{-1}, \ldots, \sigma_q^{-1})$$

and q is the rank of the matrix A. It is shown that $$A^m = \sum_{i=1}^{q} \frac{x_i}{\sigma_i^2} x_i^H A^H b$$

The equation may be used by first computing the singular values of the data matrix A and the associated singular vectors $x_1 \ldots x_q$ and substituting them into the above equation to give w. This gives a numerically well behaved method which may even be used for rank deficient systems. In minimizing the norm coefficients which proceed the irrelevant terms they will be set to zero coefficients and may be removed. This may be defined as Type I redundancy.

Self Structuring by Type II Redundancy Removal

A novel term selection method is described below which allows for finding weight vectors containing at most q non-zero weights where q is the rank of R. Let N(R) and R(R) be the nullspace and range of R respectively. Consider choosing a weight vector w for a standard Volterra Connectionist Model (VCM) for which, $$Rw=p$$

where R is an n×n symmetric matrix of rank q<n and p∈R(R) such that there are an infinite number of possible solutions. The standard algebraic technique of changing R into an echelon matrix, shows that there are (n−q) weights which can be set arbitrarily, the remaining weights being determined in terms of the actual values used.

Setting the arbitrary weights to zero and the remaining weights according gives a valid solution of an appropriate solution is gained using the SVD of R. As R is symmetric, $$R = [Y_1\ Y_2] \Sigma X^t \quad (1)$$

where the columns of $Y_1$ correspond to the q non-zero singular values and span R(R) and the columns of $Y_2$ correspond to the (n−q) zero singular values and span N(R). If $\{u_i\}$ are the columns of $Y_2$ and $w_{min}$ is the minimum norm solution of (1) then the general solution is, $$\tilde{w} = w_{min} + \sum_{i=1}^{(n-q)} a_i u_i \quad (2)$$

for arbitrary real numbers $a_i$. As (n−q) weights are arbitrary it is always possible to construct a set of equations, for which a solution exists, of the form, $$\begin{pmatrix} -\ u_2^{(1)}\ - \\ -\ u_2^{(2)}\ - \\ \vdots \\ -\ u_2^{(n-q)}\ - \end{pmatrix} \begin{pmatrix} a_1 \\ a_2 \\ \vdots \\ a_{n-q} \end{pmatrix} = - \begin{pmatrix} w'_1 \\ w'_2 \\ \vdots \\ w'_{n-q} \end{pmatrix} \quad (3)$$

where $\{u_2^{(i)}\}$ is a subset of the rows of $Y_2$ and $\{w'_i\}$ are the corresponding weights in $w_{min}$. Substituting the solution in equation (2) above yields a weight vector $\tilde{w}$ with at least (n−q) zero weights. In practice, it is found that settings (n−q) weights to zero may cause other weights also to be set to zero, thereby further simplifying the VCM. As weights are being removed by canceling them using null vectors, the corresponding non-linearities are called Inherent Nullspace Non-linearities. These Inherent Nullspace Non-linearities are an example of Type II redundancies.

In constructing (3), the columns of Y corresponding to strictly zero singular values were used. In practice, it is generally found that at least one singular value is close to but not equal to zero.

As it was assumed that equation (1) has a solution the VCM has a mean square error of $J = E[\epsilon^2]$, and it is interesting to see how this is affected if the columns of Y corresponding to non-zero singular values are used in calculating using (2) and (3). In this case, $$\tilde{w} = w_{min} + \sum_{i=1}^{(n-q)} a_i u_i + \sum_{i=1}^{k} b_i u'_i$$

where k vectors $\{u'_i\}$ corresponding to non-zero singular values $\{\sigma_i\}$ are selected. It is easy to show that, if the new set of equations of the form of (3) has a solution, then the new mean square error J' is, $$J' = J + \sum_{i=1}^{k} b_i^2 \sigma_i$$

An algorithm using the above method can be used to successfully remove Type II redundancy.

The Type I Case

For a simple example, a two pattern problem is addressed. A second order extension is used:

$$y = w_0 + w_1 x_1 + w_2 x_2 + w_3 x_1 x_2$$

The patterns are alternately presented and the smallest coefficient after 50 presentations is shown:

Indices of −2 and 1 were used except for the fourth run in which −1 and 1 were used.

| Pattern 1 | Pattern 2 | Redundancy | Eliminated Weight |
|---|---|---|---|
| (2, −1) | (−1, 2) | $x_1 x_2$ | $w_3$ |
| (2, −1) | (−2, −1) | $x_2$ | $w_2$ |
| (2, −1) | (2, 2) | $x_1$ | $w_1$ |
| (2, −1) | (−3, 2) | 1 | $w_0$ |

The results demonstrate that the network correctly eliminates unnecessary terms and so can solve a problem with a smaller network.

The Type II Case

This demonstrates, using a simple example, that the removal of Type Is is not necessarily equivalent to the removal of Type IIs. Consider training a two input VCM with second order extension and no output mapping to output 1 when the input vector is either.

or $$x'_2 = \left( \frac{1}{\sqrt{2}}\ \frac{1}{\sqrt{2}} \right) \text{ or}$$

$$x'_2 = \left( \frac{-1}{2}\ \frac{-1}{\sqrt{2}} \right)$$

Only two training examples, $x_1$ and x/, are used. Under these circumstances, two obvious models for data are available. Firstly, a circle of radius 1, and secondly, a line through the training points and the origin (see FIG. 2). The extended input vector is of the form, $$x^t = (1\ x_1\ x_2\ x_1^2\ x_1 x_2\ x_2^2)$$

The minimum norm solution in this case is, $$w_{min}^t = (0.57\ 0\ 0\ 0.29\ 0.29\ 0.29)$$

and thus has four non-zero weights. Removal of Type IIs leads to weight vector, $$w_{INN}^t = (0\ 0\ 0\ 0\ 1\ 1)$$

which has only two non-zero weights and thus gives a simpler model than that obtained using the minimum norm solution. In this case the simplest possible solution, which has only a single weight, has not been found. In practice it is found that there may be more than one way of setting (n−q) weights to zero in some problems and it is suggested that in this case an alternative solution exists, which was not found by the current algorithm, which allows more than (n−q) weights to be set to zero as explained in section entitled Self-Structuring by Type II Redundancy Removal.

Figure 4A:
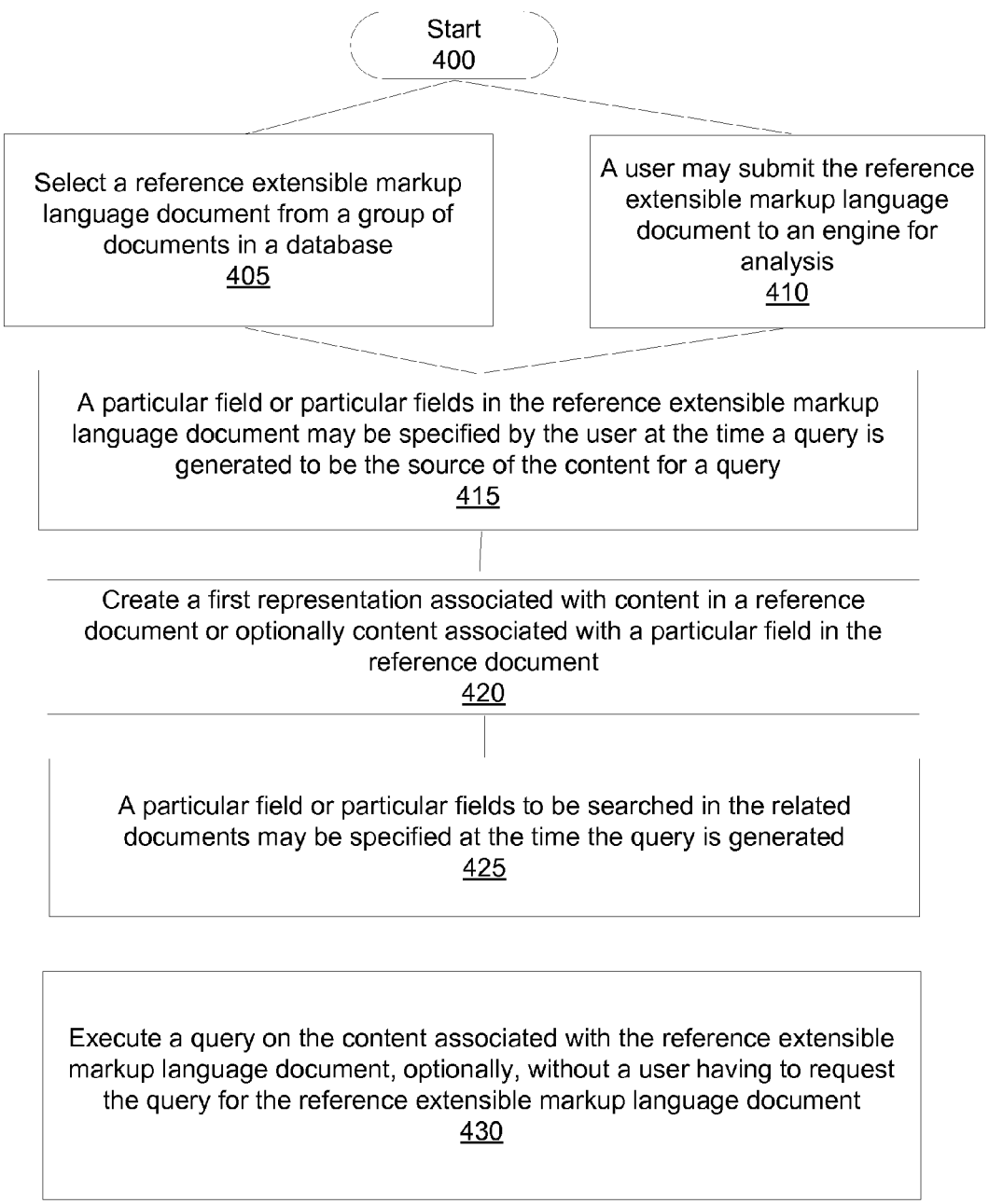
FIG. 4a and FIG. 4b illustrate an embodiment of flow diagram of a process for generating a ranked list of related documents to a reference document and a link to each of the related documents.
Figure 4B:
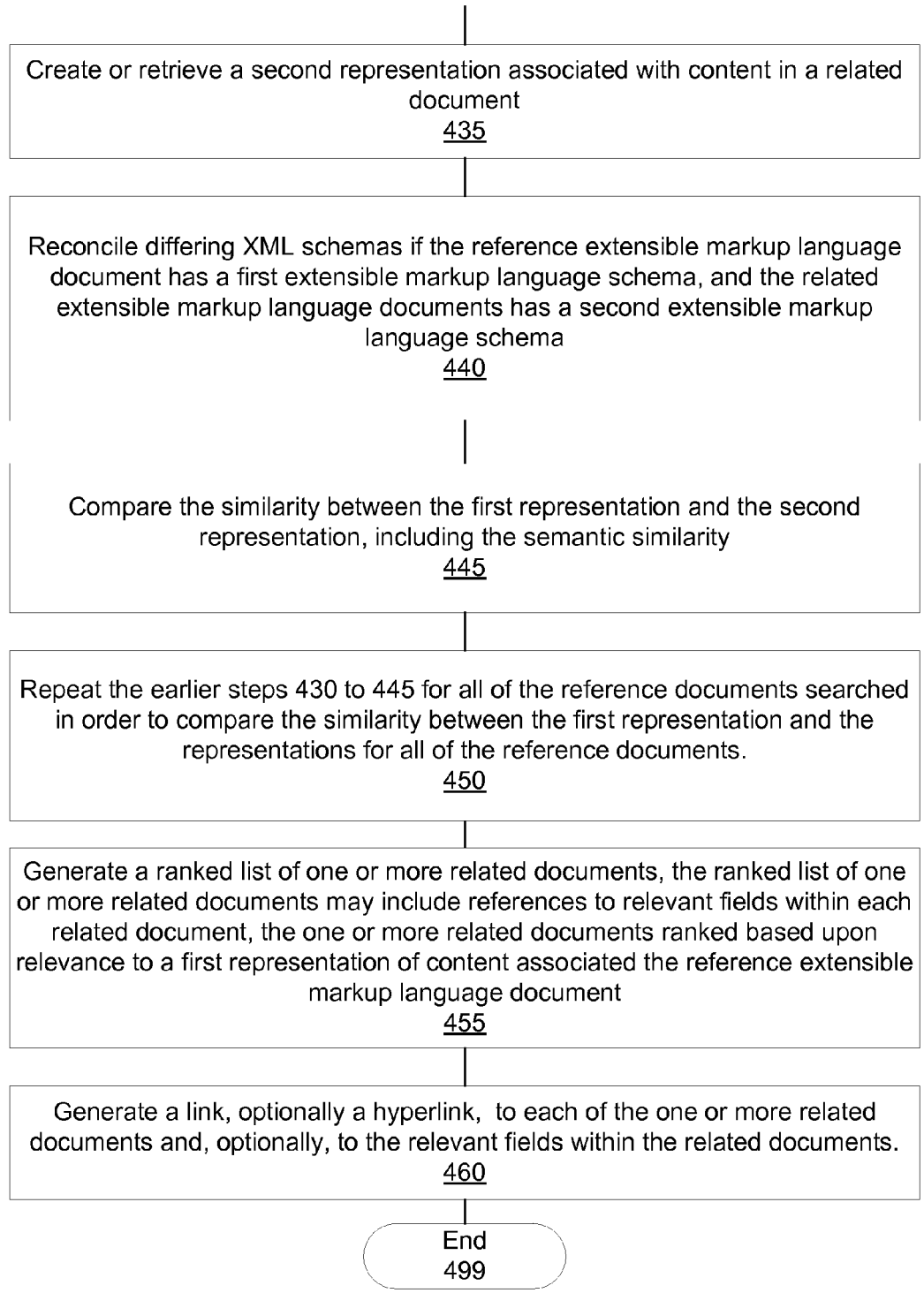

FIG. 4a and FIG. 4b illustrate an embodiment of flow diagram of a process for generating a ranked list of related documents to a reference document and a link to each of the related documents.

Overall, provisioning logic in the engine is matching a first representation derived from the content associated with the XML document to a second representation derived from the content associated with related documents in order to generate a list of these related documents and a link to these related documents. In an embodiment, the user may narrow the scope of the query and the search to content associated with a particular field in either or both the reference document and the related documents.

In block 405, either the user or the application used by the user may select a reference extensible markup language document from a group of documents in a database.

In block 410, alternatively, the user may submit the reference extensible markup language document to an engine for analysis.

In block 415, a user may specify a particular field or particular fields in the reference extensible markup language document at the time a query is generated to be the source of the content for a query.

In block 420, the engine creates a first representation associated with content in a reference document or the content associated with a particular field in the reference document.

In block 425, the user may specify a particular field or particular fields to be searched in the related documents at the time the query is generated.

In block 430, the engine executes a query on the content associated with the reference extensible markup language document. In an embodiment, the user may set the active window of the user's computer to be the source of the reference document. In this case, the engine will execute a query on the content in the active window without the user having to request the engine to query the reference extensible markup language document.

In block 435, the engine creates or retrieves a second representation associated with content in a related document.

In block 440, the engine reconciles differing XML schemas if the reference extensible markup language document has a first extensible markup language schema, and the related extensible markup language document has a second extensible markup language schema.

In block 445, the engine compares the similarity between the first representation and the second representation, including the semantic similarity.

In block 450, the engine repeats the earlier steps 430 to 445 for all of the reference documents searched in order to compare the similarity between the first representation and the representations for all of the reference documents.

In block 455, the engine generates a ranked list of one or more related documents. The ranked list of one or more related documents may include references to relevant fields within each related document. The one or more related documents are ranked based upon relevance to the first representation of content associated the reference extensible markup language document.

In block 460, the engine generates a link to each of the one or more related documents and, optionally, to the relevant fields within the related documents. In an embodiment, the link is a hot link such as a hyperlink.

In block 499, the engine waits for new content to be submitted in order to begin the process again.

Figure 5:
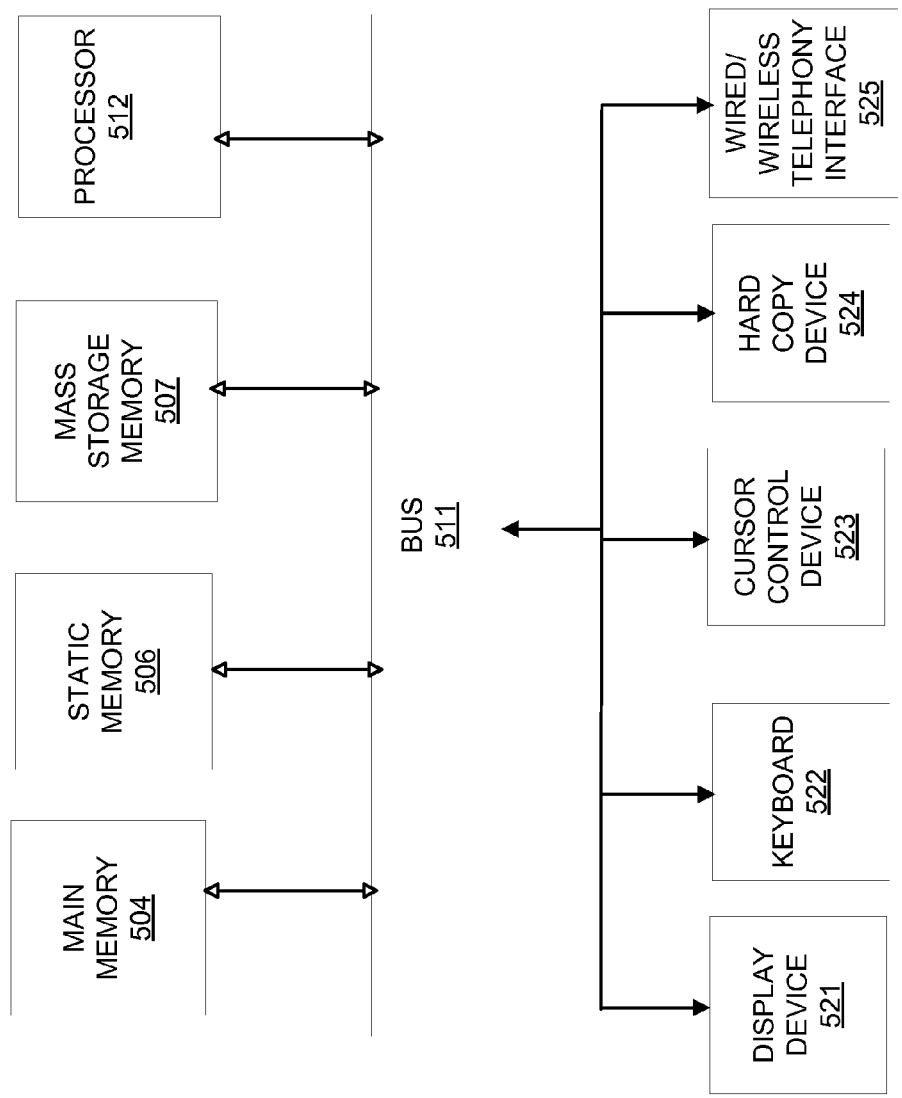
FIG. 5 is a block diagram of an exemplary computer system that may be used to perform one or more of the functions described herein.

FIG. 5 is a block diagram of an exemplary computer system that may be used to perform one or more of the functions described herein. Computer system 500 may comprise an exemplary client or server computer system. Computer system 500 comprises a communication mechanism or bus 511 for communicating information, and a processor 512 coupled with bus 511 for processing information. Processor 512 includes a microprocessor, but is not limited to a microprocessor, such as, for example, Pentium™ PowerPC™, Alpha™, etc.

Computer system 500 further comprises a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also comprises a read only memory (ROM) and/or other static storage device 506 coupled to bus 511 for storing static information and instructions for processor 512, and a mass storage memory 507, such as a magnetic disk or optical disk and its corresponding disk drive. Mass storage memory 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device (keyboard) 522, including alphanumeric and other keys, may also be coupled to bus 511 for communicating information and command selections to processor 512. An additional user input device is cursor control device 523, such as a mouse, trackball, trackpad, stylus, or cursor direction keys, coupled to bus 511 for communicating direction information and command selections to processor 512, and for controlling cursor movement on a display device 512.

Another device that may be coupled to bus 511 is a hard copy device 524, which may be used for printing instructions, data, or other information on a medium such as paper, film, or similar types of media. Furthermore, a sound recording and playback device, such as a speaker and/or microphone (not shown) may optionally be coupled to bus 511 for audio interfacing with computer system 500. Another device that may be coupled to bus 511 is a wired/wireless communication capability 525 to communication to a phone or handheld palm device.

In an embodiment, the software used to facilitate information operations on unstructured information can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.

While some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

We claim:

1. A computer-readable media that store instructions, which when executed by a machine, cause the machine to perform operations, comprising:

analyzing content in an active desktop window to generate a set of most relevant terms and mathematical values associated with those relevant terms from the content in the active desktop window;

generating a query on the content from the active desktop window; executing a search on content in one or more documents based on the content from the active desktop window in the query;

generating a ranked list of documents related to the content in one or more documents based on relevance to at least the set of most relevant terms and mathematical values associated with those relevant terms from the content in the active desktop window;

generating links to the ranked list of documents, wherein each link points to one or more relevant fields within the ranked list of documents, wherein the analyzing of content in the active desktop window and the generating of the query and the executing of the search and the generating of the ranked list and the generating of the links are all executed without a user having to request any of these operations; and displaying the generated ranked list of documents on a display of a computing device.

2. The computer-readable media of claim 1, wherein the set of most relevant terms is determined based upon use of a Bayesian algorithm.

3. The computer readable medium of claim 2, storing instructions, which when executed by the machine, cause the machine to perform further operations comprising:

creating a first representation of the content from the active desktop window for the query by performing at least the following, eliminating redundant terms in a corpus of terms contained within the content by using a first algorithm to generate a set of most relevant terms;

determining one or more weighted values with each term in the set of most relevant terms; and creating a structure for the first representation of the content from the active desktop window to contain the set of most relevant terms from the content and the one or more weighted values associated with each term in the set of most relevant terms.

4. The computer readable medium of claim 3, storing instructions, which when executed by the machine, cause the machine to perform further operations comprising:

comparing the most relevant terms from a first instance of a first similar representation to the most relevant terms in a historical instance of the first similar representation;

refining the one or more weighted values associated with each most relevant term in the first instance based upon the comparison; and correlating a similarity between the first representation of the content from the active desktop window and representations of the one or more documents based upon the set of most relevant terms and weighted values associated with each term.

5. The computer readable medium of claim 3, storing instructions, which when executed by the machine, cause the machine to perform further operations comprising:

creating two or more separate representations of each of the one or more documents to be searched; and creating links between each separate representation of the one or more documents to be searched.

6. The computer readable medium of claim 5, wherein a first extensible markup language document from the one or more documents to be searched has a first extensible markup language schema, and a second extensible markup language document from the one or more documents to be searched has a second extensible markup language schema that is different from the first extensible markup language schema, and the extensible markup language schemas define a tag set and names associated with each tag and the differing extensible markup language schemas are reconciled by inserting an additional tag-value pair into each representation to establish a common extensible markup language schema.

7. The computer readable medium of claim 1, storing instructions, which when executed by the machine, cause the machine to perform further operations comprising:

importing the content in the active desktop window as a first reference extensible markup language document having a first extensible markup language schema;

analyzing a first extensible markup language document from the one or more documents to be searched that has a second extensible markup language schema, which is different than the first extensible markup language schema;

creating a first representation of content associated with the first reference extensible markup language document, the first representation including a first set of terms and one or more weighted values associated with each term in the first set of terms;

identifying a second representation of content associated with the first extensible markup language document, the second representation including a second set of terms and a second weighted value associated with each term in the second set of terms;

comparing an internal extensible markup language tag-value pair that was inserted into the first and second representations while allowing the first representation and second representation to keep their original tag-value pair nomenclature from their original extensible markup language schemas, wherein the internal extensible markup language tag-value pair creates a common extensible markup language tag-value pair regarding a particular topic; and comparing the similarity between the first representation of the content from the active desktop window for the query to the second representation of the first extensible markup language document from the one or more documents to be searched by using the set of most relevant terms and weighted values associated with each term and the internal extensible markup language tag-value pair inserted into each representation.

8. A computer-readable media that stores instructions, which when executed by a machine, cause the machine to perform operations comprising:

executing a search on content in one or more documents based on a content of a query, wherein the content of the query comes from one or more specified fields but less than all of the fields in a reference extensible markup language document;

creating a first representation of content associated with the one or more specified fields in the reference extensible markup language document;

generating a list of one or more related documents to the query ranked based upon relevance to the first representation of content associated with the one or more specified fields in the reference extensible markup language document;

generating a link for each of the one or more related documents in the list of one or more related documents, wherein each link points to a relevant field within each of the one or more related documents; and creating the first representation of content associated with the one or more specified fields of the reference extensible markup language document by performing at least the following:

eliminating redundant terms in a corpus of terms contained within the content by using a first algorithm to generate a set of key terms; and determining one or more weighted values with each term in the set of key terms based on at least adaptive modeling techniques and a Bayesian algorithm.

9. The computer readable medium of claim 8, wherein a first field from the one or more specified fields in the reference extensible markup language document is specified at the time a query is generated.

10. The computer readable medium of claim 8, wherein the executed search on the query is generated without a user having to request the query.

11. The computer readable medium of claim 8, storing instructions, which when executed by the machine, cause the machine to perform further operations comprising:

storing the first representation of the content, the first representation containing the set of key terms from the content and one or more weighted values associated with each term in the set of key terms;

comparing the key terms from a first instance of the first representation to the key terms in a historical instance of the representation;

refining the one or more weighted values associated with each key term in the first instance based upon the comparison; and correlating similarity between similar but literally different representations of the one or more documents to be searched based upon the set of key terms and the weighted values associated with each term.

12. The computer readable medium of claim 8, storing instructions, which when executed by the machine, cause the machine to perform further operations comprising:

reconciling differing extensible markup language schemas when the first representation of content derived from the reference extensible markup language document has a first extensible markup language schema, and a second representation of content derived from first document of the one or more related documents has a second extensible markup language schema by inserting an internal extensible markup language tag-value pair into the first and second representations while allowing the first representation and second representation to keep their original tag-value pair nomenclature from their original extensible markup language schemas, wherein the internal extensible markup language tag-value pair creates a common extensible markup language tag-value pair regarding a particular topic.

13. The computer readable medium of claim 8, storing instructions, which when executed by the machine, cause the machine to perform further operations comprising:

creating a plurality of representations for each of the one or more documents to be searched, wherein each one of the plurality of representations includes a plurality of key terms and relational probabilities of the corresponding descriptive content;

storing the plurality of representations in a common database; and creating links between the plurality of representations.

14. The computer readable medium of claim 8, wherein one or more fields to be searched but less than all of the fields, in a first document from the one or more related documents to be search, are specified fields at the time a query is generated.

15. A system, comprising:

a software engine stored on a computer-readable media which has executable instructions, which when executed by a machine, cause the machine to perform operations, wherein the engine further includes an intelligence layer having code to analyze content in an active desktop window and to generate a set of most relevant terms and mathematical values associated with those relevant terms from the content in the active desktop window;

a query handler having code to generate a query on the content from an active desktop window and to initiate a search on content in one or more documents based on at least the set of most relevant terms and mathematical values associated with those relevant terms from the content in the active desktop window;

wherein the intelligence layer has code to generate a ranked list of documents related to the content in one or more documents based on relevance to at least the set of most relevant terms and mathematical values associated with those relevant terms from the content in the active desktop window, and has code to generate links to the ranked list of documents, wherein the links point to one or more relevant fields within the ranked list of documents, wherein the intelligence layer has code to analyze content in the active desktop window and generate the ranked list and generate the links without a user having to request any of these operations, wherein the query handler has code to the generate the query and initiate the search without a user having to request any of these operations; and computing device having a display to display the generated ranked list of documents on the display.

16. The system of claim 15, wherein the software engine further comprises:

a reconciler module and a hierarchical module to cooperate with the intelligence layer to create a first representation of the content from the active desktop window for the query by performing at least the following, eliminating redundant terms in a corpus of terms contained within the content by using a first algorithm to generate an initial set of most relevant terms;

refining the initial set of most relevant terms by determining a statistical relevance and relational probability between the terms for each term in the initial set of most relevant terms to create the set of most relevant terms;

determining one or more weighted values with each term in the set of most relevant terms;

generating a structure for the first representation content in the active desktop window to contain the set of most relevant terms from the content and the one or more weighted values associated with each term in the set of most relevant terms; and inserting an additional extensible markup language tag-value pair into the first representation while allowing the first representation to keep its original tag value pair nomenclature from its original extensible markup language schema to establish a common extensible markup language schema with representations derived from content in documents having a different extensible markup language schema than the original extensible markup language schema for the first representation.

17. The system of claim 16, wherein the software engine further comprises:
a database to store representations including the first representation, wherein the intelligence layer correlates similarity between similar but literally different representations based upon at least the set of most relevant terms and weighted values associated with each term and the internal extensible markup language tag-value pair.

18. The system of claim 16, wherein the software engine further comprises:
a content converter to extensible markup language module and an extensible markup language parser module to convert and pass the content in an active desktop window to the intelligence layer for the analysis.

* * * * *